H. H. STEPHENS.
GYRATORY SHAFT HANGER.
APPLICATION FILED JAN. 25, 1919.
1,302,872.
Patented May 6, 1919.
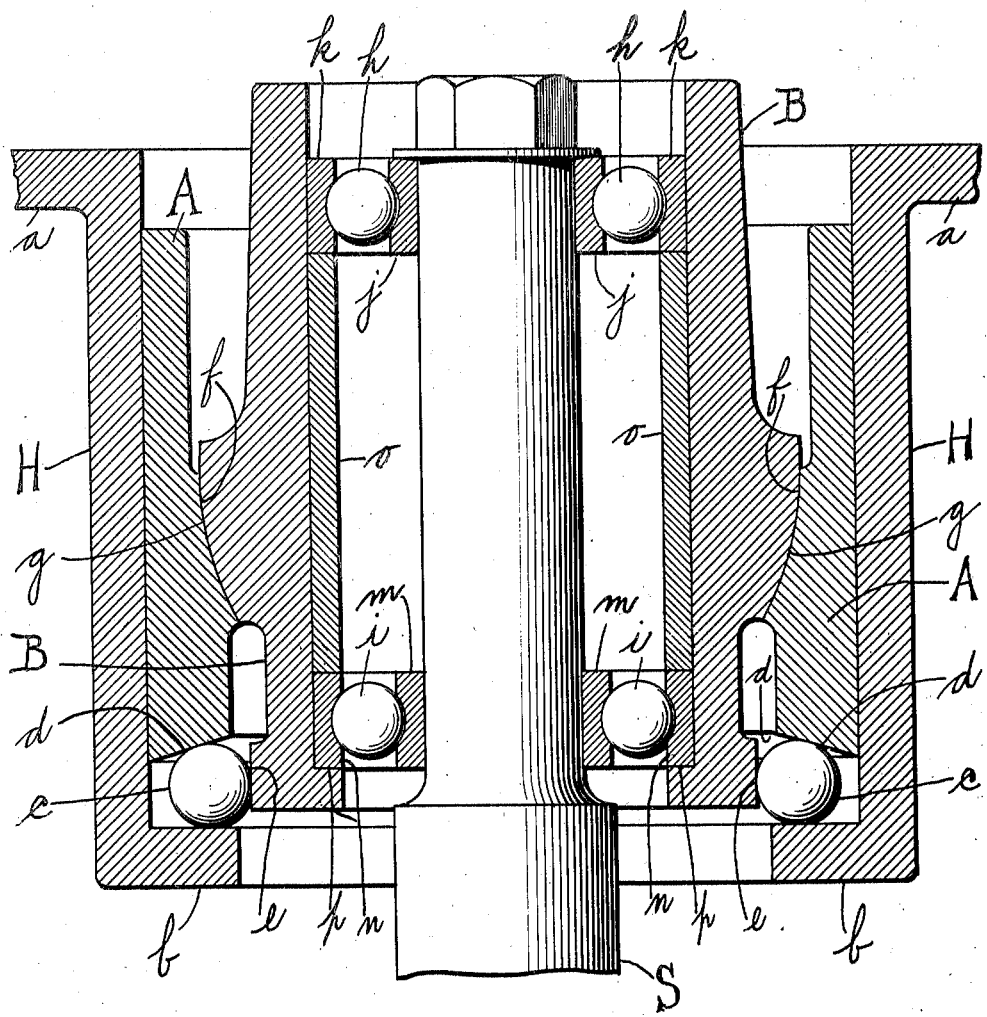

UNITED STATES PATENT OFFICE.

HARRY H. STEPHENS, OF PATERSON, NEW JERSEY.

GYRATORY-SHAFT HANGER.

1,302,872.　　　Specification of Letters Patent.　　Patented May 6, 1919.

Application filed January 25, 1919. Serial No. 273,047.

*To all whom it may concern:*

Be it known that I, HARRY H. STEPHENS, a citizen of the United States, residing in Paterson, State of New Jersey, have invented a new and useful Gyratory-Shaft Hanger, of which the following is a specification.

My invention relates to means for suspending centrifugal machines or to other apparatus employing a gyrating shaft or spindle.

My invention resides in apparatus for suspending a shaft or spindle which gyrates or partakes of equivalent or similar movement, involving structure whereby the gyration or oscillation of the shaft or spindle is resisted by the weight of the shaft or spindle or of the shaft or spindle and the load carried or driven thereby, the action being such that any lateral movement of the spindle or shaft operates upon a member supporting it and its load in such manner as to lift or tend to lift said member with the shaft or spindle and its load.

Structure of the character referred to is particularly suitable for suspending centrifugal machines, comprising the usual drum or basket rotated at high speed, and which, due to dissymmetry in structure or loading, or both, causes the suspending shaft or spindle to oscillate or gyrate. Structure of the character herein disclosed makes it possible to dispense with the usual rubber or other resilient buffer commonly employed in connection with centrifugal hanger structures.

For an illustration of one of the various forms my invention may take, reference is to be had to the accompanying drawing, which is a vertical sectional view, partly in elevation, of structure embodying my invention.

Referring to the drawing, H is the hanger having the flange $a$ by which it is rigidly secured to any suitable support, as beams of a building, etc. At its bottom it has the inwardly turned flange $b$ upon whose inner face rests a series of balls $c$, as in a ball bearing. Upon these balls $c$ rests the member A fitting and sliding vertically within the hanger member H. The lower ball engaging face $d$ of the member $a$ is shown conical in form, though the surface $d$ may be of any other suitable form and disposition. It is shown inclined upwardly and inwardly, the balls $c$ being confined between said surface $d$, flange $b$ and the peripheral surface $e$ on the inner member B, which is a sleeve having a bearing surface $f$ engaging the bearing surface $g$ on the member A. These bearing surfaces $f$, $g$ are parts of the surface of a sphere, so that there is in effect a ball and socket joint between the members A and B. S is a shaft or spindle upon which may be secured a centrifugal basket driven by any suitable means at high speed, as well understood in the art. Or any other device or load may be carried or driven by the shafts $s$. The shaft rotates with respect to the member B upon the upper and lower circular rows or series of balls $h$ and $i$, the former running in the inner and outer race members $j$ and $k$ and the lower balls $i$ running in similar race members $m$ and $n$. The race member $k$ rests upon the tube or cylindrical separator sleeve $o$, which in turn rests upon the lower race member $n$, which in turn rests upon a flange $p$ on the member B.

The shaft or spindle S, while rotating, may oscillate or gyrate, as when driving a centrifugal basket which is unsymmetrically loaded or which is unsymmetrically constructed. In gyrating, the ball sleeve B will move upon the socket sleeve A. The gyration or oscillation is resisted, however, by the lateral thrust of the bearing surface $e$ on the ball sleeve B against balls $c$, which it forces laterally, and in so doing lifts or tends to lift the sleeve A vertically in the hanger H. The sleeve A in fact carries the weight of the shaft and everything attached thereto, and therefore any upward movement or tendency to upward movement on the part of the socket sleeve A means a lifting of the shaft and the weight carried thereby or attached thereto. Thus, the weight of the shaft and the parts attached thereto oppose the aforesaid lateral movement of the balls $c$ and so oppose or restrict the oscillations or gyrations of the shaft S.

The same operation takes place when the shaft S does not rotate but is simply secured, without the ball bearings $h$ and $i$, to the ball sleeve B. In such case, where the spindle or shaft S does not rotate, it may be disposed within a hollow shaft, rotating on the shaft S, the hollow shaft carrying the centrifugal basket or other driven member.

By structure of the character above described, gyration or oscillation is opposed by a force due to the weight of the shaft and attached parts without recourse to the usual rubber buffer or equivalent means heretofore employed in the art.

While the ball sleeve B may oscillate or move with respect to the socket member A about the center of the sphere of which their bearing surfaces *f* and *g* are a part, the members B and A preferably do not rotate about a vertical axis, any suitable means being employed to prevent such rotation, if necessary.

During gyration or oscillation of the shaft S the lower end of the ball sleeve member B swings to one side closer to the conical or other surface *d* on the member A and causes the same to rise or tend to rise due to pressure exerted on said surface *d*; indirect operation of B upon A is preferred, particularly through rolling devices as balls *c*, though in principle it is the lower end of member B which thrusts against the surface *d* of member A.

What I claim is:

1. The combination with a support, of coöperating members supported thereby and capable of oscillation with respect to each other, a vertical shaft supported by one of said members, and means transmitting to one of said members from the other a force tending to raise said one of said members and the coöperating member.

2. The combination with a hanger, of a sleeve member movable vertically therein, a second member having a gyratory bearing thereon, a shaft supported by said second member, and means contacting with said hanger and said members adapted to transmit from said second member to said sleeve member during oscillation a force raising or tending to raise said sleeve member in said hanger in opposition to gravity acting through said shaft.

3. The combination with a hanger, of a sleeve member movable vertically therein, a second member having a gyratory bearing thereon, a shaft supported by and rotatable with respect to said second member, and means contacting with said hanger and said members adapted to transmit from said second member to said sleeve member during oscillation a force raising or tending to raise said sleeve member in said hanger in opposition to gravity acting through said shaft.

4. The combination with a hanger, of a sleeve movable vertically therein and having an inclined bearing surface, roller structure intervening between said bearing surface and a bearing surface on said hanger, a second member having a gyratory bearing upon said sleeve and having a bearing surface engaging said roller structure, a shaft supported by said second member, whereby upon gyration or oscillation of said shaft a force is transmitted through said roller structure from said second member to said sleeve member tending to raise the same in opposition to gravity acting through said shaft.

5. The combination with a hanger, of a sleeve movable vertically therein and having an inclined bearing surface, balls engaging said surface and a bearing surface on said hanger, a second member having a gyratory bearing upon said sleeve member and having a bearing surface engaging said balls, and a shaft supported by said second member, whereby upon oscillation or gyration of said shaft said second member transmits through said balls to said sleeve member a force tending to raise the same in opposition to the force of gravity acting downwardly through said shaft.

6. The combination with a hanger, of a sleeve member movable vertically therein and having an inclined bearing surface and a spherical bearing surface, balls intervening between said inclined bearing surface and a bearing surface on said hanger, a second member having a spherical bearing surface engaging the spherical surface of said sleeve member and having a lateral bearing surface engaging said balls, and a shaft supported by said second member, whereby when said shaft oscillates or gyrates said second member moves on its said spherical bearing surface with respect to said sleeve member and transmits through said balls to said sleeve member a force tending to raise the same in opposition to gravity acting through said shaft.

7. The combination with a hanger, of a vertical gyratory shaft, and means supporting said shaft on said hanger comprising members coöperating to resist gyration of said shaft by raising said shaft against gravity.

In testimony whereof I have hereunto affixed my signature this 23d day of January, 1919.

HARRY H. STEPHENS.